Patented Feb. 19, 1929.

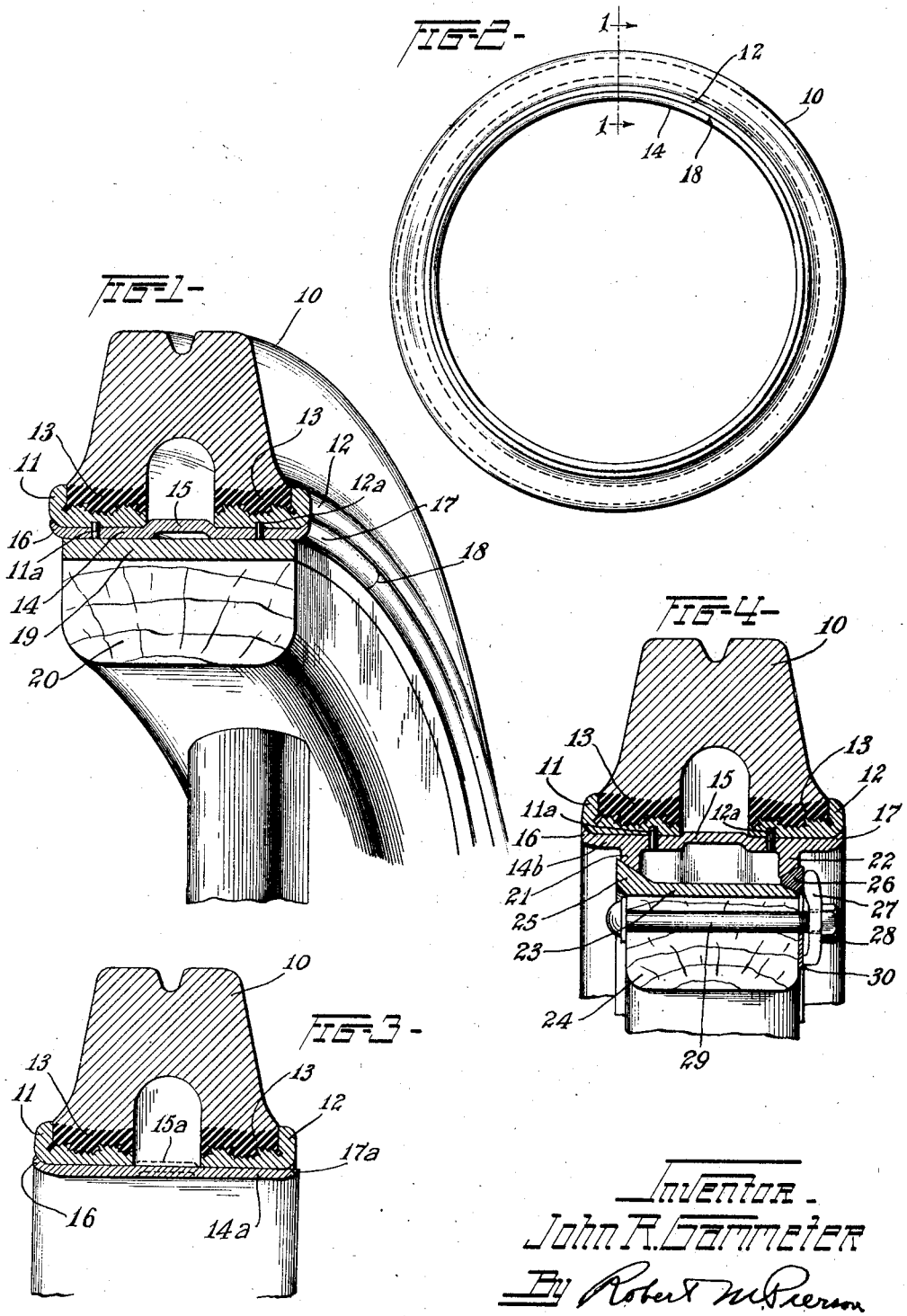

1,702,648

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

METHOD OF MAKING WHEEL-RIM ASSEMBLIES.

Original application filed October 6, 1921, Serial No. 505,883. Divided and this application filed November 3, 1924. Serial No. 747,677.

This invention relates to the art of wheel-rim and tire structures, being especially applicable for making hollow rubber tires such as are commonly called cushion tires, and mounting them upon their wheels. The present application is a division of my application Serial No. 505,883, filed October 6, 1921.

My chief object is to provide an improved cushion tire and rim structure and an improved method for making and assembling the elements of a structure of this character whereby a pair of separately formed tire-base members, preferably having the respective legs of the hollow tire-body vulcanized thereto, may readily be provided with means for holding them in determinate relation upon the wheel.

Of the accompanying drawings:

Fig. 1 is a fragmentary view, in section and perspective, of a wheel, rim and tire structure showing a wheel rim assembly made in accordance with my invention and adapted for use with a cylindrical felly-band adapted to receive a tire in "pressed-on" relation.

Fig. 2 is a side elevation of the same on a smaller scale, showing, at line 1—1, where the section of Fig. 1 is taken.

Fig. 3 is a sectional view of a tire and an auxiliary base member, illustrating a preferred procedure for forming a particular type of tire and rim structure.

Fig. 4 is a sectional view of an embodiment suited for a wheel having a felly-band adapted to receive a common form of demountable tire-carrying rim.

Referring to the drawings, 10 is the tire-body or cushion tire having an arched cross-sectional form, each leg thereof being secured by vulcanization to an annular base member or ring 11, 12. The tire-body usually is built upon the base members and upon a sectional core interposed between them, the core being removed after the tire has been vulcanized. In using the term "arched" in the description and in certain of the appended claims I refer to tires of this type having an internal longitudinal channel or cavity cleft or slotted at the inner periphery for the removal of the molding core, regardless of the ultimate spacing of the base members in the finished tire and rim assembly. 13, 13 are layers of hard rubber compound used between the base members 11, 12 and the cushion 10 to obtain good adhesion of the tire-body to the base members.

For holding the base members 11, 12 in fixed relation, in the particular embodiment here shown, I provide an auxiliary base member and locking ring 14 (Fig. 1) formed with a circumferential rib 15 adapted to lie between the base members 11, 12 when said ring is inserted within the latter, and with outwardly-turned side flanges 16, 17 adapted to fit the outer shoulders of said base members to prevent the latter from spreading apart, said rib and flanges being formed by displacing or deforming the metal of the ring beyond its elastic limit by a bending and stretching action to bring it into interlocking relation with the tire base members while the ring is held therein, whereby a perfect fit is obtained. The ring 14 may be transversely split, as indicated at 18 (Figs. 1 and 2), either before or after the deforming operation, so that in subsequent mounting of the ring it may be sprung into place within the base members 11, 12, or the ring may be endless or continuous. In the latter case, especially, I prefer to give it the form shown in full lines in Fig. 3, the ring here being designated $14^a$, before mounting the tire upon it, and then after so mounting the tire, mechanically displace or deform the metal of the ring by bending and stretching, forcing it outward, as by rolling or swaging, to form the circumferential rib and the last-formed side flange, as indicated by the dotted lines at $15^a$ and $17^a$ respectively in Fig. 3. In the embodiment illustrated in Figs. 1, 2 and 3, the tire with the ring therein, whether the latter be split or not, may be simply pressed onto the felly-band or fixed rim member 19 upon the felly 20, as is commonly done with solid tires having an integral metal base, and such mounting of the ring upon the fixed rim expands or stretches it against the tire bases in interlocked engagement therewith. While the tire bases 11, 12, and the auxiliary base 14 are thus frictionally held against relative circumferential movement, dowels $11^a$, $12^a$ may be provided between the base members and the auxiliary base, either with or without the rib 15 and the flanges 16, 17, to prevent circumferential as well as lateral relative movement.

The modified form of ring or auxiliary base designated $14^b$ in Fig. 4 is adapted to serve as a demountable rim, being provided with circumferential seating flanges 21, 22, formed with oppositely beveled, annular, seating surfaces which are of least diameter at the adjacent or inner sides of said flanges. It is thus adapted to seat upon a fixed rim or felly-band 23 upon a felly 24, said felly-band being formed at one side with a circumferential rim-seating flange 25 beveled to fit the seating face of the flange 21, and at the other side beveled to receive a wedging ring 26, which preferably is transversely split and so formed as to engage in a wedging action both the fixed rim or felly-band 23 and the flange 22 of the auxiliary rim 14$^b$. 27 is one of a set of clamps adapted to force the wedging ring 26 into position, under action of a nut 28 upon a bolt 29 mounted in the felly 24. 30 is a metal washer upon the bolt 29 for supporting the inner end of the clamp 27 and thus protecting the felly from indentation or defacement thereby.

In this embodiment the auxiliary base or carrying rim 14$^b$ may be endless, and the circumferential rib 15 and the side flanges 16, 17 may be formed by rolling or swaging in place, as above described, the ring being stretched against the tire base members. Said rim or ring alternatively may be transversely split and, having been previously formed or provided with the circumferential rib, or other spacing means, and with the side flanges, by stretching it against the tire-base members, may be sprung into position within the tire and expanded thereagainst by the action of the clamps, the base members 11, 12 providing sufficient circumferential strength for the structure.

In both of these embodiments the base members 11, 12 of the tire are securely held in proper spaced relation, and my invention thus renders it highly practical to construct the tire with completely separated base members, permitting, in the forming of the tire-body, the use of an annular, sectional molding core which may readily be withdrawn from the tire-body after the latter has been vulcanized to its base members. My invention also provides a convenient form of carrying support for such a tire.

The specific embodiment of my invention shown in Fig. 4 is the subject of an application, Serial No. 591,786, filed by me October 2, 1922, as a division of Serial No. 505,883, filed October 6, 1921.

Various modifications, especially as regards the form of the locking ring and the mode of associating it with the base members as well as the manner of mounting said locking ring as an auxiliary base or carrying rim upon the wheel, may be resorted to without departing from the scope of my invention, and I do not limit my claims wholly to the exact procedure described.

I claim:

1. The method of making a wheel-rim assembly which comprises assembling a tire base comprising a plurality of separate tire-base members with a metal, annular, auxiliary member for holding them in determinate relation, and effecting interlocking engagement of said tire-base with said auxiliary member by mechanically displacing the metal of the latter beyond its elastic limit against the tire base members.

2. The method of making a wheel-rim assembly which comprises vulcanizing an arched tire-body onto a plurality of separate base members, associating an endless metal ring with said tire-base members, and stretching the metal of said ring into interlocked relation to said tire-base members.

3. The method of making a wheel-rim assembly which comprises vulcanizing an arched tire-body onto a plurality of separate tire-base members, assembling said tire-base members with a metal, annular, auxiliary member for holding them in determinate relation, and expanding said auxiliary member into transverse-interlocking relation with said tire-base members.

4. The method of making a wheel-rim assembly which comprises vulcanizing an arched tire-body onto a plurality of separate tire-base members, assembling said tire-base members with a metal, annular, auxiliary member for holding them in determinate relation, and expanding said auxiliary member into close frictional and transverse-interlocking relation with said tire-base members by pressing the assembly onto the fixed-rim of a wheel.

5. The method of forming a cushion tire structure which comprises curing a tire body upon annular base sections having a channel forming core between them, removing the core, and stretching a ring against the inner faces of said sections to rigidly secure the same together.

6. The method of forming a cushion tire structure which consists in curing a tire having an inner channel, upon spaced annular side sections and stretching a ring into engagement with said side sections.

In witness whereof I have hereunto set my hand this 27th day of October, 1924.

JOHN R. GAMMETER.